(12) United States Patent
Chen-Sarkanen et al.

(10) Patent No.: US 10,119,027 B2
(45) Date of Patent: Nov. 6, 2018

(54) COMPOSITIONS INCLUDING LIGNIN

(71) Applicant: REGENTS OF THE UNIVERSITY OF MINNESOTA, Minneapolis, MN (US)

(72) Inventors: Yi-ru Chen-Sarkanen, New Brighton, MN (US); Simo Sarkanen, New Brighton, MN (US); Yun-Yan Wang, Saint Paul, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 15/125,380

(22) PCT Filed: Mar. 13, 2015

(86) PCT No.: PCT/US2015/020599
§ 371 (c)(1),
(2) Date: Sep. 12, 2016

(87) PCT Pub. No.: WO2015/138996
PCT Pub. Date: Sep. 17, 2015

(65) Prior Publication Data
US 2017/0166749 A1     Jun. 15, 2017

Related U.S. Application Data

(60) Provisional application No. 61/953,118, filed on Mar. 14, 2014.

(51) Int. Cl.
*C08L 97/00*     (2006.01)
*C08H 7/00*     (2011.01)
(Continued)

(52) U.S. Cl.
CPC .............. *C08L 97/005* (2013.01); *C08H 6/00* (2013.01); *C08K 5/07* (2013.01); *C08K 5/136* (2013.01)

(58) Field of Classification Search
CPC ...................................................... C08L 97/005
See application file for complete search history.

(56) References Cited

U.S. PATENT DOCUMENTS

| 2,589,252 | A | * | 3/1952 | Heritage | .................. C08H 6/00 530/500 |
| 4,739,040 | A | * | 4/1988 | Naae | .................. B01F 17/0028 530/500 |
| 6,172,204 | B1 | * | 1/2001 | Sarkanen | .................. C07G 1/00 106/164.01 |

FOREIGN PATENT DOCUMENTS

| CA | 2942704 A1 | 9/2015 |
| CN | 1304950 A * | 7/2001 |

(Continued)

OTHER PUBLICATIONS

Li et o al, The First Alkylated 95-100 Percent Kraft Lignin-Based Plastics., 1997, Proc. 9th Internat. Symp. Wood Pulp. Chem. 63, 1-6.*

(Continued)

*Primary Examiner* — Melvin C. Mayes
*Assistant Examiner* — Stefanie Cohen
(74) *Attorney, Agent, or Firm* — Mueting, Raasch & Gebhardt, PA

(57) ABSTRACT

Disclosed herein are compositions that include at least about 75 weight percent (wt %) alkylated lignin based on the total weight of the composition without any solvent(s). The material having a tensile strength of at least about 35 MPa, an elongation-to-break of at least about 1.5%, or both. Articles including such materials and methods of forming the same are also disclosed.

19 Claims, 12 Drawing Sheets

(51) Int. Cl.
*C08K 5/07* (2006.01)
*C08K 5/136* (2006.01)

(56) References Cited

FOREIGN PATENT DOCUMENTS

| WO | WO 2013/158219 A1 | 10/2013 |
|---|---|---|
| WO | WO 2015/138996 A1 | 9/2015 |

OTHER PUBLICATIONS

Ikeda et al, Studies on the Effect of Ball Milling on Lignin Structure Using a Modified DFRC Method, 2002, J, Agric Food Chem, 50, pp. 129-135.*

Northwest Advance Renewables Alliance, "Value-Added Polymer and Carbon Products from Lignin," Aug. 2011-Mar. 2013:120-148.
Li et al, "Plasticizers that Transform Alkylated Kraft Lignins into Versatile Thermoplastics," 1997, University of Minnesota.
Wang, "Through Lignin Biodegradation to Lignin-based Plastics," dissertation for University of Minnesota Graduate School, Jan. 2015:1-93.
Zhu et al., "Using Sulfite Chemistry for Robust Bioconversion of Douglas-fir Forest Residue to High Titer Bioethanol and Lignosulfonate: A Pilot-Scale Demonstration" 2015 *Bioresource Technology*, 179:390-397.
International Patent Application No. PCT/US2015/020599 filed Mar. 13, 2015; International Search Report and Written Opinion dated Jun. 10, 2015; 11 pages.
International Patent Application No. PCT/US2015/020599 filed Mar. 13, 2015; International Preliminary Report on Patentability dated Sep. 22, 2016; 7 pages.

* cited by examiner

[1] 5% PEG (mol. wt. 400)

[2] 5% PEG (mw 400), 5 % PEG (mw 10k)

[3] 15% PEG (mol. wt. 4.6k)

[4] 5% PEG (mw 400), 5% PEG (mw 4.6k)

[5] 10% PEG (mw 400); [6] 15 % PEG (mw 2k)

[7] 15% PEG (mw 10k); [8] 15 % PEG (mw 35k)

[0] 100% MBML; [1] 5% PEG ($M_n$ 400); [2] 5% PEG ($M_n$ 400), 5% PEG ($M_n$ 10,000); [3] 15% PEG ($M_n$ 4600); [4] 5% PEG ($M_n$ 400), 5% PEG ($M_n$ 4600); [5] 10% PEG ($M_n$ 400); [6] 5% PEG ($M_n$ 1000); [7] 15% PEG ($M_n$ 2000); [8] 15% PEG ($M_n$ 10,000); [9] 15% poly(ethylene glycol) methyl ether (PEGM) ($M_n$ 5000).

COMPOSITIONS INCLUDING LIGNIN

PRIORITY

This application is the § 371 U.S. National Stage of International Application No. PCT/US2015/020599, filed 13 Mar. 2015, which claims priority to U.S. Provisional Application No. 61/953,118 filed on Mar. 14, 2014 entitled Compositions Including Lignin, the entire disclosures of which are incorporated herein by reference thereto.

GOVERNMENT FUNDING

This invention was made with government support under 2011-067009-20062 and 2011-68005-30416 awarded by the National Institute of Food and Agriculture, USDA. The government has certain rights in the invention.

SUMMARY

Disclosed herein are compositions and materials that include an alkylated lignin. Also disclosed are articles formed from disclosed compositions having various properties. Also disclosed are methods of forming such compositions and articles. Also disclosed are methods of forming an article including forming a composition as disclosed herein; and forming an article from the composition.

Also disclosed herein are materials that include at least about 75 weight percent (wt %) alkylated lignin based on the total weight of the composition without any solvent(s), the material having a tensile strength of at least about 35 MPa, an elongation-to-break of at least about 1.5%, or both. Articles including such materials and methods of forming the same are also disclosed.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
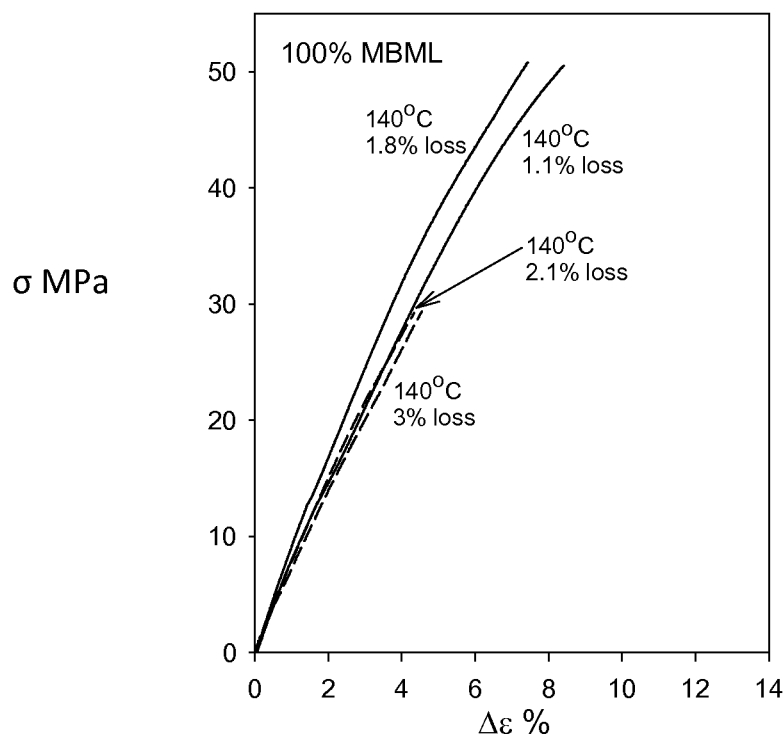
FIG. 1 shows a graph of tensile strength ($\sigma$ MPa) versus elongation-at-break ($\Delta\varepsilon$%) for compositions containing 100 wt % methylated ball milled lignin (MBML) solvent cast for differing periods of time at 140° C.

The compositions and articles disclosed herein can be considered a significant advance in next-generation plastics with high lignin contents. In some embodiments, disclosed compositions and articles involve methylation of a lignin preparation followed by blending with various quantities (for example anywhere from 0 wt % to 25 wt %) of secondary, e.g., miscible polymeric, oligomeric and/or monomeric components. Despite the relative simplicity of disclosed compositions, these new polymer blends embody by far the highest lignin contents of any materials reported with useful mechanical properties.

Promising tensile properties for materials composed of unbranched un-crosslinked flexible polymer chains may be encompassed by ranges of strengths, for example 36-72 MPa and elongations-at-break, for example 1.2-6.0%, variously exhibited by polystyrene and poly(methyl methacrylate). These noted properties of polystyrene and poly (methyl methacrylate) have been met or exceeded, by disclosed compositions, in some embodiments by compositions including only disclosed alkylated lignins alone and in other embodiments by compositions containing a secondary component, for example a miscible component. For example, disclosed compositions containing anywhere from 0 wt % to 25 wt % of commercially available polymers, oligomers or simple low-molecular-weight compounds can provide exceptional properties.

The economic importance of the disclosed lignin-based plastics may lie in the prospects for "biorefining" lignocellulosic plant materials (including wood) to produce liquid "biofuels" and other commodity organic chemicals. It is generally agreed that biorefineries will require significant value added to the lignin co-products from lignocellulose for increased economic viability. Disclosed compositions take a truly significant step forward toward this goal.

The context in which the disclosed compositions have been derived may be briefly described as follows. The lignin-containing polymeric materials previously disclosed, for example between 1970 and 2000, were limited in their usefulness by the fact that increasing lignin contents resulted in worse mechanical properties, as far as the overall trends were concerned. Generally, materials with lignin contents greater than 35-40% were fatally compromised. Previous work with kraft-lignin-based plastics overcame this limitation and demonstrated the feasibility of incorporating methylated kraft lignin preparations (derived from softwood pulp mills) at 70-75% levels into polymeric-material blends with quite promising behavior as lignin-based plastics.

Disclosed compositions are illustrated herein by both "ball-milled lignins" from softwood (Jack pine), which were initially chosen because their preparation (involving aqueous 96% dioxane extraction of wood meal) is recognized by all workers in lignin chemistry, and by a chemically modified lignin, ligninosulfate. Both ball-milled softwood lignin preparations and a ligninosulfate preparation were methylated (as exemplified, quite completely methylated) with dimethyl sulfate under alkaline conditions and then diazomethane. It is thought, but not relied upon that other alkylated lignin materials, for example alkylated (e.g., methylated) ligninosulfate containing materials will have similar properties to those shown herein for the alkylated ball milled lignins.

Disclosed herein are compositions that include lignins. Lignin provides structure to plant cell-wall materials and is the component responsible for the strength of wood against mechanical stress for example. Lignin is a highly abundant biopolymeric material (second only to cellulose) and can be derived from, for example, wood via processes that have been used for many years. Lignin is an amorphous, polyphenolic macromolecule with a complex structure. Despite extensive investigations, the complex and irregular structure of lignin is not completely understood. The physical and chemical properties of lignin can vary depending upon the wood species, the botanical origin, and the region from which the wood is harvested, and the process by which the lignin is isolated.

Disclosed compositions can utilize lignin in various forms, both native and chemically modified. For example, disclosed compositions can utilize native lignin (not chemically modified) and chemically modified lignin such as for example ligninsulfonates (also referred to as lignosulfonate). In some embodiments, any form of lignin can be utilized. Useful lignin components may be obtained from a number of plant-based lignin-removing processes, including the kraft, organosolv, steam explosion, soda, autohydrolysis extraction processes, and mechanical milling. Lignins from these sources are readily available. For example, kraft lignin derivatives are by-products of the principal process employed in the United States for chemically converting wood chips into pulp for making paper. Instead of burning the kraft lignin derivative as fuel in the pulp mill, it may be used to prepare disclosed compositions.

In some embodiments, disclosed compositions can utilize native lignins. Native lignin refers to lignin that has not been chemically cleaved. Native lignin can include lignin that has been mechanically cleaved however. One method of isolating lignin from its starting product (for example, wood of some sort) includes milling along with inert balls followed by extraction. Such lignin can be referred to as ball milled lignin (referred to herein as "BML"). Various known and heretofore unknown methods and processes of obtaining BML can be utilized to obtain native lignin that can be utilized in disclosed compositions. In some embodiments, mechanical methods other than ball milling can also be utilized assuming that they do not chemically cleave a substantial amount of bonds in the lignin. In some embodiments, methods other than ball milling can also be utilized assuming that they do not chemically cleave virtually any bonds in the lignin.

In some embodiments, compositions can utilize chemically modified lignins such as lignosulfonates. Lignosulfonates or sulfonated lignin (CAS number 8062-15-5) are water soluble anionic polyelectrolyte polymers that are byproducts from the production of wood pulp using sulfite pulping. Lignosulfonates have a relatively broad range of molecular mass (e.g., they are polydisperse). Molecular masses from 1000 to 140,000 daltons have been reported from softwood lignosulfonates with lower values typical for hardwoods. Lignosulfonates can be formed using the Howard process to produce calcium lignosulfonate (CAS 904-76-3). Various extraction methods, including ultrafiltration and ion-exchange for example can be utilized to obtain lignosulfonates from pulp liquids.

In some embodiments more than one type of lignin can be utilized in disclosed compositions and materials. In some embodiments native lignin and one or more chemically modified lignin could be utilized in disclosed compositions. For example, in some compositions both native lignin, such as ball milled lignin, and lignosulfonates could be utilized in disclosed compositions.

Regardless of the type of lignin, it is used in an alkylated form. The phrase "alkylated lignin" as utilized herein can refer to any type of lignin, be it a native lignin or a chemically modified lignin, in which at least some hydrogen atoms of hydroxyl groups have been replaced with an alkyl group. In some embodiments, alkylation, alkylating, or alkylated lignin, can refer to replacing at least some hydrogens of hydroxyl groups, for example free hydroxyl groups, on the lignin with an alkyl group (for example any alkyl group). Stated another way, alkylation changes hydroxyl groups (—OH groups) (e.g., free hydroxyl groups) to alkoxy groups (—O(CH$_2$)$_n$CH$_3$, where n can range from 0 to 3, for example) (e.g., free alkoxy groups). The hydroxyl groups that are modified can be free hydroxyl groups, the hydroxyl that is part of the sulfonate (which would convert the sulfonic acid groups to alkyl sulfonate ester groups), other hydroxyl groups, or any combination thereof. In some embodiments, alkylation can be done with methyl groups (CH$_3$, where n equals zero), ethyl groups (CH$_2$CH$_3$, where n equals one), propyl groups ((CH$_2$)$_2$CH$_3$, where n equals two), or butyl groups (CH$_2$)$_3$CH$_3$, where n equals three). In some embodiments, lignin utilized in disclosed compositions can be methylated, ethylated, or a combination thereof for example.

In some embodiments, disclosed compositions can include alkylated BML. For example, methylated ball milled lignin (also referred to as "MBML") can be utilized, or ethylated ball milled lignin (also referred to as "EBML") can be utilized. In some embodiments, methylated lignosulfonate, ethylated lignosulfonate, or any combination thereof can be utilized in disclosed compositions.

Disclosed compositions can also include lignin preparations that possess aromatic rings with one methoxyl substituent. An example of such a material can be referred to as a lignin composed of guaiacyl units. Specific examples resulting from the alkylation of such materials would include methylated lignin derivatives possessing one original aromatic methoxyl substituent and additional aromatic and/or aliphatic methoxyl groups.

In some embodiments, any extent of alkylation can be utilized. In some embodiments, the alkylation can be substantially complete (for example, at least 98% of the free hydroxyl groups can be converted to alkoxy groups). In some embodiments, the amount of alkylation can be almost any amount, for example at least 95%, at least 90%, at least 85%, at least 75%, at least 50%, at least 40%, or any number in between. As more of the lignin is alkylated, the hydrogen bonding in the lignin polymer will be decreased. In some embodiments, it is not clear to what extend the aliphatic hydroxyl groups are alkylated even though the aromatic hydroxyl groups are thought to be substantially or even in some embodiments completely derivatized.

Alkylation increases the weight of the lignin polymer in comparison to the non-alkylated version. This is true because alkylation removes a hydrogen atom (atomic weight about 1 g/mol) and replaces it with an alkyl group. In embodiments where the alkyl group is a CH$_3$ group (molecular weight of about 15 g/mol), this increases the molecular weight of the lignin polymer by about 14 g/mol for each hydrogen replaced with a methyl group. As such, an alkylated lignin will have a lower lignin weight percent in a final composition than does its corresponding unalkylated lignin counterpart in the same composition.

In some embodiments where the alkylation will be methylation, various methods can be utilized to at least partially methylate the lignin. In some embodiments, any electrophilic methyl source can be utilized. Examples can include, iodomethane, dimethyl sulfate, dimethyl carbonate, methyl triflate, and methyl fluorosulfonate for example. In some embodiments, a nucleophilic methyl source can be utilized. Examples can include, diazomethane, methyllithium and Grignard reagents for example. Similar reagents can be used in instances where the lignin is to be ethylated, propylated, or butylated for example.

In some disclosed compositions, various amounts of alkylated lignin can be utilized. In some embodiments, compositions can include at least 75 weight percent (wt %) based on the total dry weight of the composition. Components in disclosed compositions can be described by the weight of the component based on the total dry weight of the total composition. The dry weight of the composition can be further described by the total weight of all of the components except any solvent that may be added to effect various methods of forming an article. In some embodiments, the total weight of a composition can include the weight of the alkylated lignin component and any secondary component(s). In some embodiments, compositions can include at least 75 wt % alkylated lignin component based on the total weight of the composition (without any solvent(s)). In some embodiments, compositions can include at least 80 wt % alkylated lignin component based on the total weight of the composition (without any solvent(s)). In some embodiments, compositions can include at least 85 wt % alkylated lignin component based on the total weight of the composition (without any solvent(s)). In some embodiments, compositions can include at least 90 wt % alkylated lignin component based on the total weight of the composition (without any solvent(s)). In some embodiments, compositions can include at least 95 wt % alkylated lignin component based on the total weight of the composition (without any solvent(s)). In some embodiments, disclosed compositions can include substantially all alkylated lignin, or 100 wt % of the total composition.

Disclosed compositions can also include one or more than one secondary component. A secondary component can also be characterized as a plasticizer, for example. One or more secondary components, if utilized, can be chosen in order to alter properties of a 100 wt % alkylated lignin article. In some embodiments, a secondary component can be chosen based on the ability of the chemical structure of the secondary component to interact with or affect aromatic portions of the alkylated lignin in a way that positively affects the properties of the alkylated lignin. It should also be noted that low molecular weight components within the alkylated lignin polymer could also act as plasticizers for the alkylated lignin polymer.

In some embodiments, virtually any secondary component could be utilized in disclosed compositions. Secondary component(s), if utilized, could be chosen based on various different properties, including, for example the ability of the secondary component to interact with the alkylated lignin polymer, relative cost of the secondary component(s), mechanical properties of the secondary component(s) or mechanical properties the secondary component(s) imparts to the alkylated lignin, non-mechanical properties (e.g., renewability, biodegradability, or others), or combinations thereof. In some embodiments, a secondary component(s) can be chosen based on the ability of the secondary component(s) to form a miscible blend with the alkylated lignin polymer.

Exemplary secondary components can include for example polymers such as poly(ethylene oxide), poly(ethylene oxide-b-1,2-butadiene-b-ethylene oxide), poly (ethylene glycol), and main-chain aliphatic polyesters. Exemplary secondary components can also include small molecules such as diethyl adipate, and 3,3',5,5'-tetrabromobisphenol A, for example. It should be noted that polymeric, monomeric, oligomeric and small molecule secondary components other than those exemplified herein are also envisioned herein.

Disclosed compositions can be formed into articles, for example polymeric articles using known and as yet heretofore unknown methods. For example, solvent casting, melt blending followed by extrusion, or compression molding. In methods such as solvent casting, for example, a composition can include one or more than one solvent that can be chosen based on, at least in part, the ability of the solvent(s) to form a blend of the alkylated lignin and optional secondary component(s).

Articles formed from disclosed compositions can be formed into or used as any type of structure including for example block structures (regular or irregular), sheet structures, or film structures. Properties of the formed article that may be relevant or of interest may vary depending on the type of structure and the purpose for which the article is to be used. Exemplary properties that may be relevant can include, for example mechanical properties such as tensile strength, elongation at break, ductility, plastic deformation, bending characteristics, and melt rheology.

In some embodiments, disclosed articles or materials can have tensile strengths of at least about 35 MPa. In some embodiments, disclosed articles or materials (e.g., those formed from disclosed compositions) can have tensile strengths of at least about 40 MPa. In some embodiments, disclosed articles or materials (e.g., those formed from disclosed compositions) can have tensile strengths of at least about 50 MPa. In some embodiments disclosed articles or materials (e.g., those formed from disclosed compositions) can have tensile strengths of at least about 60 MPa. In some embodiments disclosed articles or materials (e.g., those formed from disclosed compositions) can have an elongation-at-break of at least about 1.5%. In some embodiments, disclosed articles or materials (e.g., those formed from disclosed compositions) can have an elongation-at-break of at least about 3%. In some embodiments, disclosed articles or materials (e.g., those formed from disclosed compositions) can have an elongation-at-break of at least about 5%. In some embodiments, disclosed articles or materials (e.g., those formed from disclosed compositions) can have an elongation-at-break of at least about 7%. In some embodiments, disclosed articles or materials (e.g., those formed from disclosed compositions) can have an elongation-at-break of about 10% or greater.

EXAMPLES

Objects and advantages are further illustrated by the following examples, but the particular materials and amounts thereof recited in these examples, as well as other conditions and details, should not be construed to unduly limit this disclosure.

All chemicals were obtained from Aldrich, Inc. (or a similar commercial provider) and were used without further purification unless otherwise noted.

Ball-Milled Lignin Isolation

Jack pine sapwood chips were ground in a Wiley mill to a 40-mesh particle size. The resulting wood meal was Soxhlet-extracted with acetone for about 48 hours (h). The dry extractive-free wood meal was then milled in a vibratory ball mill under $N_2$ for about 48 h. Each milling jar was loaded with about 6 grams (g) wood meal and stainless steel balls (diameter of about 12 mm) to about 80% of the volume of the container. An about 40 g quantity of the ball-milled wood meal was suspended and stirred in about 400 milliliters (mL) dioxane:water (96:4 volume/volume) for about 24 h. The extraction was repeated with about 300 mL fresh dioxane:water (96:4 volume/volume) for about 24 h and then about 200 mL dioxane:water (96:4 volume/volume) for about 48 h. The extracts were centrifuged (3000 rpm, Beckman J6B, 30 minutes) and combined. The solvents were removed by rotary evaporation.

A 1 g quantity of the crude product was purified by dissolving it in about 28 mL pyridine:acetic acid:water (9:1:4 v/v/v) and extracting with about 36 mL chloroform in a separatory funnel. The mixture was centrifuged at about 3000 rpm until the organic layer was clear. After removal of the emulsion and aqueous layers, the organic layer, after adding about 36 mL chloroform, was further extracted with the aqueous layer from 64 mL of a pyridine:acetic acid:water:chloroform (9:1:4:18 v/v/v/v) mixture. A clear organic extract was again collected by repeating the preceding steps. The solvents were removed from the organic extracts by rotary evaporation. Ethanol was added and evaporated under reduced pressure at about 35° C. repeatedly until most of the pyridine had been removed. The glossy residue in the flask was re-dissolved in 10 mL dichloroethane:ethanol (2:1 v/v). The resulting solution was slowly added to a vigorously stirred 250 mL volume of ether. The precipitates were washed three times with ether and then air-dried.

Methylation of Lignin Preparations with Dimethyl Sulfate

The lignin preparation prepared as above was dissolved (about 20 g/L) in aqueous 60% dioxane containing 0.10 molar (M) NaOH. Dimethyl sulfate (Aldrich, Inc.) was added at a level of 2 mL/g lignin to the solution under $N_2$. The pH of the mixture kept falling as a result of hydroxyl-group methylation. Solution containing 2.0 M NaOH and corresponding amounts of dioxane were repeatedly added to dissolve any precipitates formed during methylation and to adjust the pH of the mixture to a value between 12.5 and 13.5. When the pH remained constant upon basification, the same amount of dimethyl sulfate was again added. This overall procedure was repeated 4 times. Upon the 5th addition of dimethyl sulfate and aqueous dioxane containing 2.0 M NaOH, the mixture, after incubation, was neutralized with aqueous 0.5 M $H_2SO_4$. The dioxane was removed exhaustively at neutral pH by rotary evaporation at about 35° C. The residue was washed with distilled water until complete removal of $SO_4^{2-}$ was accomplished and the product was air-dried. The partially methylated product was further methylated by diazomethane as described below.

Methylation with Diazomethane

The diazomethane used was prepared by distilling it from Diazald (Aldrich, Inc.) in an aqueous base-chloroform mixture. A 30 mL volume of chloroform was added to a cold biphasic mixture composed of 30 mL aqueous 1 g/mL KOH and 30 mL 2-ethoxyethanol in a 250 mL clear-seal-joint distilling flask from the Diazald kit. The chloroform-aqueous KOH-2-ethoxyethanol mixture was magnetically stirred and heated in a water bath at about 80° C. When the first drop of chloroform appeared at the collecting end of the condenser in the apparatus, 150 mL 0.1 g/mL Diazald in chloroform was slowly introduced into the mixture in the distilling flask over a period of about 15 to 20 min, and then an additional 75 mL volume of fresh chloroform was added to the boiling mixture. The diazomethane was collected together with chloroform in a receiving flask under ice. The cold diazomethane-chloroform solution was mixed with 1 g of the lignin preparation that had been methylated with dimethyl sulfate and pre-dissolved in chloroform. The mixture was kept in the dark overnight. In order to discharge the unreacted diazomethane, the mixture was extracted with 0.5 M $H_2SO_4$ 5 times and thoroughly washed with distilled water. After sufficient centrifugation at 3000 rpm, the clear chloroform layer was dried with anhydrous $Na_2SO_4$ and filtered. The chloroform was removed by rotary evaporation.

The above methylation procedures were utilized to afford complete methylation of lignin preparations and lignin derivatives. However, less thorough methylation would also result in useful lignin-based materials, although in certain instances there could be significant differences in the mechanical properties of the blends produced.

Solvent Casting

A 0.6 g quantity of methylated lignin sample with or without blend component(s) was dissolved in 4.0 mL dimethyl sulfoxide (DMSO) in a 10×20 mm Teflon mold at 50° C. or higher temperature. The solution was degassed under reduced pressure in a vacuum oven at 50° C. The corresponding test piece was produced by solvent casting at the chosen temperature for about 24 h. In some cases, the last trace of DMSO was removed at 180° C. (3 h) under reduced pressure. The solid rectangular test piece was filed into a dog-bone-shaped specimen, of which the typical distance between shoulders was about 7~8 mm and the width was about 5 mm. The articles cast for FIGS. 3, 4, 5 and 6 were cast at 150° C. for about 23 hours.

Tensile Test

The tensile behavior of each methylated lignin-based blend (in the form of a dog-bone-shaped test piece) was characterized by means of a stress-strain curve measured with an Instron model 5542 unit fitted with a 500 N static load cell. Serrated jaws were used to hold all test pieces in place. No tensile test was initiated until the load reading had become stable. A crosshead speed of 0.05 mm min$^{-1}$ was employed with specimen gauge lengths of 7~8 mm. Young's modulus (E) and the stress ($\sigma_{max}$) and strain ($\varepsilon_{o,max}$) at fracture were calculated on the basis of initial sample dimensions.

Results

The first composition formed and tested herein included 100% methylated ball milled lignin (MBML). The MBML dissolved in solvent (as discussed above) was casted for different periods of time during which different amounts of low-molecular-weight methylated lignin components were lost. Up to a point, longer casting times generally result in greater losses of low-molecular weight alkylated lignin components. As seen in FIG. 1, the solvent cast article showed a tensile strength of about 50 MPa and an elongation-at-break of about 7-8% under conditions where the weight loss was 1.1-1.8%. The change in the tensile strength may be due to the loss of low molecular weight lignin components under different casting conditions.

Figure 2:
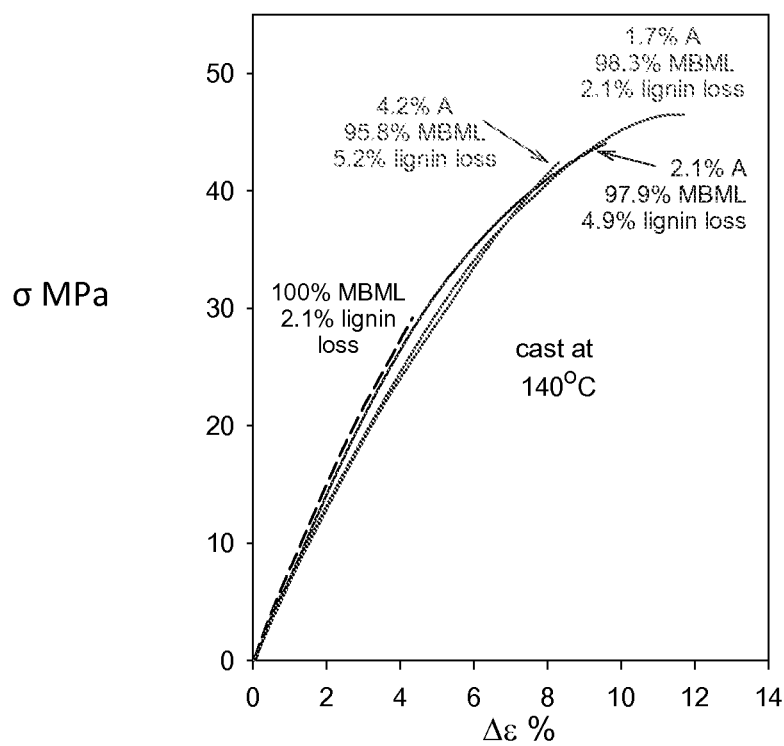
FIG. 2 shows a graph of tensile strength ($\sigma$ MPa) versus elongation-at-break ($\Delta\varepsilon$%) for compositions containing various amounts of MBML and diethyl adipate (A) solvent cast at 140° C.

The second compositions tested included diethyl adipate. Results for these solvent cast articles are seen in FIG. 2. Compositions (weight percent reported irrespective of solvent) with 100 wt % MBML, 98.3 wt % MBML (1.7 wt % diethyl adipate), 97.9 wt % MBML (2.1 wt % diethyl adipate), and 95.8 wt % MBML (4.2 wt % diethyl adipate) were all made, solvent cast and tested. As seen therein, a small quantity (1.7%) of diethyl adipate in the blend engendered an increase in the elongation-at-break to about 12% while having only a small negative effect on tensile strength (which fell to 46 MPa).

Compositions including poly(ethylene oxide) (referred to herein and in FIG. 3 as "PEO"), poly(ethylene oxide-b-1,2-butadiene) (referred to herein and in FIG. 3 as "EB") and poly(ethylene oxide-b-1,2-butadiene-b-ethylene oxide) (referred to herein and in FIG. 3 as "EBE"), were made, solvent cast and tested. The feasibility of obtaining significant increases in tensile strength (to 68 MPa) can be seen in MBML blends containing 15 wt % EBE, which underwent fracture when the elongation-at-break reached 7%.

Figure 3:
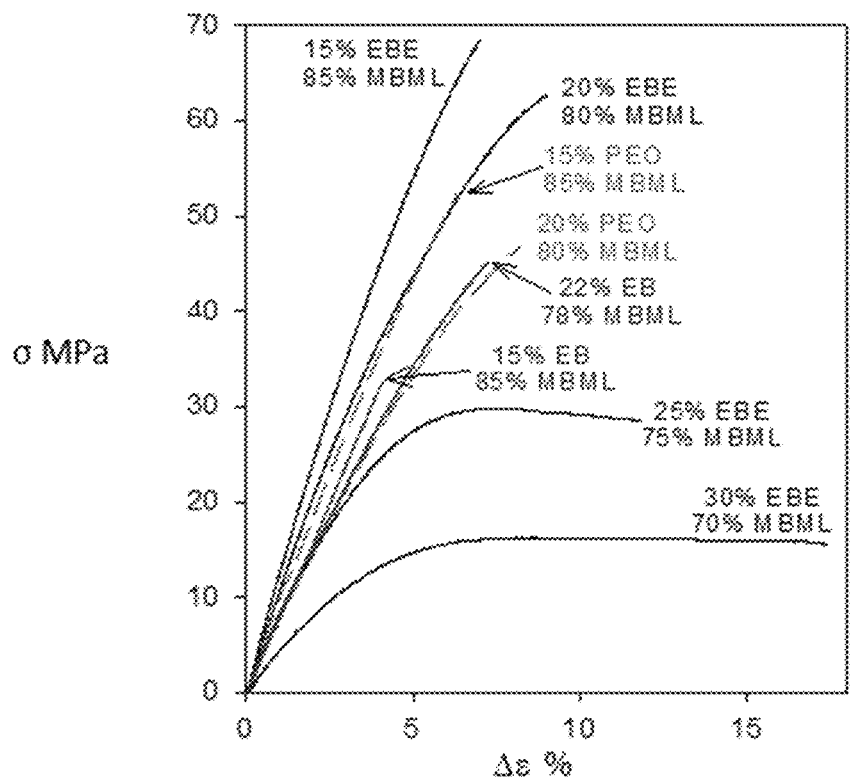
FIG. 3 shows a graph of tensile strength ($\sigma$ MPa) versus elongation-at-break ($\Delta\varepsilon$%) for compositions containing differing amounts of MBML, poly(ethylene oxide) (referred to in FIG. 3 as "PEO"), poly(ethylene oxide-b-1,2-butadiene) (referred to in FIG. 3 as "EB") and poly(ethylene oxide-b-1,2-butadiene-b-ethylene oxide) (referred to in FIG. 3 as "EBE") solvent cast at 150° C.
Figure 4:
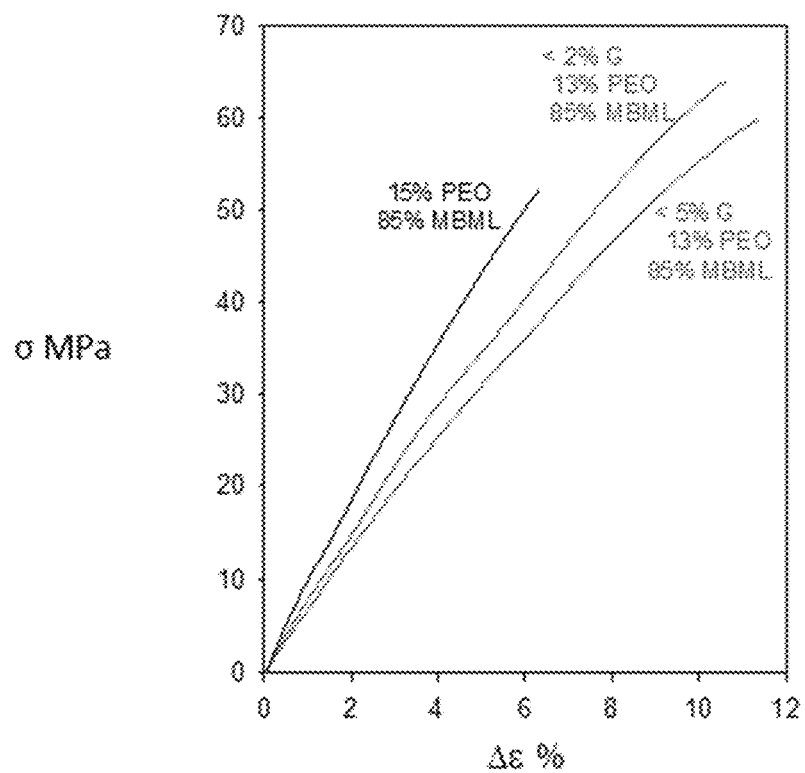
FIG. 4 shows a graph of tensile strength ($\sigma$ MPa) versus elongation-at-break ($\Delta\varepsilon$%) for compositions containing differing amounts of MBML, PEO and diethyl glutarate (referred to in FIG. 4 as "G") solvent cast at 150° C.

Compositions with more than one secondary component were also investigated. For example, compositions that included PEO and diethyl glutarate (referred to as "G" in FIG. 4) were also made, solvent cast and tested. Results of this testing can be seen in FIG. 4. MBML blends with 15 wt % (10,000 molecular weight) PEO can exhibit a tensile strength of 52 MPa with an elongation-at-break beyond 6% (FIGS. 3 and 4). MBML blends containing 13 wt % PEO in the presence of very small quantities of diethyl glutarate (<2%) may possess a tensile strength of 64 MPa with an elongation-at-break of 11% (FIG. 4). It should be noted that the diethyl glutarate is most likely almost entirely lost during casting because of the casting conditions. Therefore, it is thought, but not relied upon, that the diethyl glutarate allows the aromatic chains of the lignin polymers to rearrange themselves as it is being removed from the solution during casting to form a final article.

Figure 5:
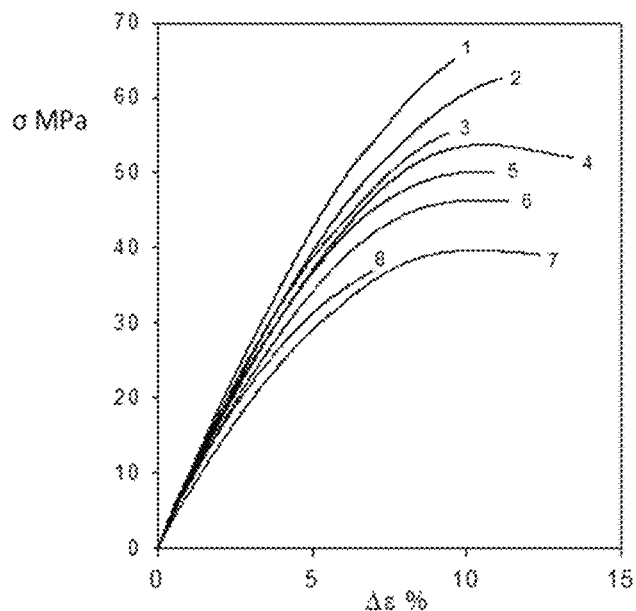
FIG. 5 shows a graph of tensile strength ($\sigma$ MPa) versus elongation-at-break ($\Delta\varepsilon$%) for compositions containing differing amounts of MBML and poly(ethylene glycol) (referred to in FIG. 5 as "PEG") fractions with differing molecular weights solvent cast at 150° C.

Compositions containing various amounts of one or two types of poly(ethylene glycol) (referred to herein and in FIG. 5 as "PEG") were also made, solvent cast and tested. MBML blends with 5 wt % levels of 400 molecular weight PEG may exhibit a tensile strength of 65 MPa with an elongation-at-break close to 10% (FIG. 5). As seen in FIG. 5, the molecular weight distributions of the blend components can have a noticeable effect. MBML blends with a 5% level of 400 molecular-weight PEG and a 5% level of 4600 molecular-weight PEG can possess tensile strengths of 52 MPa with an elongation-at-break beyond 13% (FIG. 5).

Figure 6:
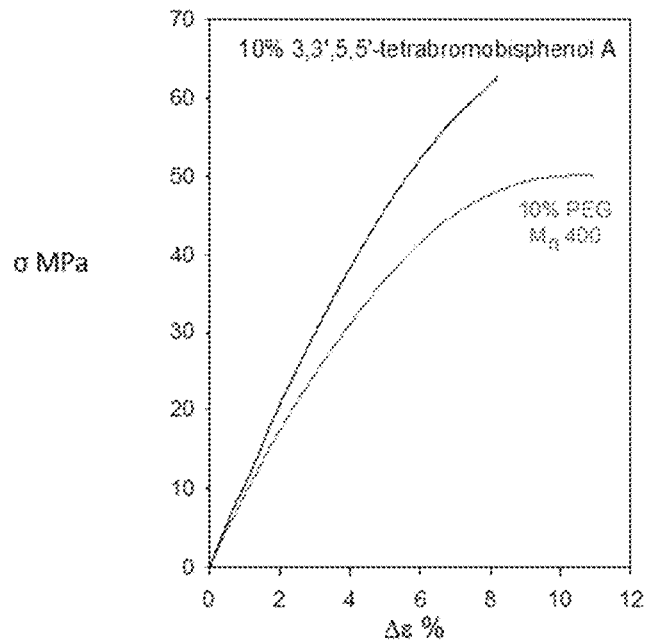
FIG. 6 shows a graph of tensile strength ($\sigma$ MPa) versus elongation-at-break ($\Delta\varepsilon$%) for compositions containing MBML and either PEG or 3,3',5,5'-tetrabromobisphenol A solvent cast at 150° C.

A commercially available low-molecular-weight aromatic compound was also investigated for its usefulness in a miscible MBML blend. For example, 3,3',5,5'-tetrabromo-bisphenol A (a flame retardant) blended at 10% levels with MBML can result in polymeric materials possessing a 62 MPa tensile strength with an 8% elongation-at-break (FIG. 6). This compares favorably with the corresponding blend involving a 10% level of 400 molecular-weight PEG in MBML that exhibited a tensile strength of 50 MPa with an elongation-at-break of 11% (FIGS. 4 and 5).

Methylated Ball-Milled Softwood Lignin in Blends with Low-$T_g$ Polyesters

Figure 7:
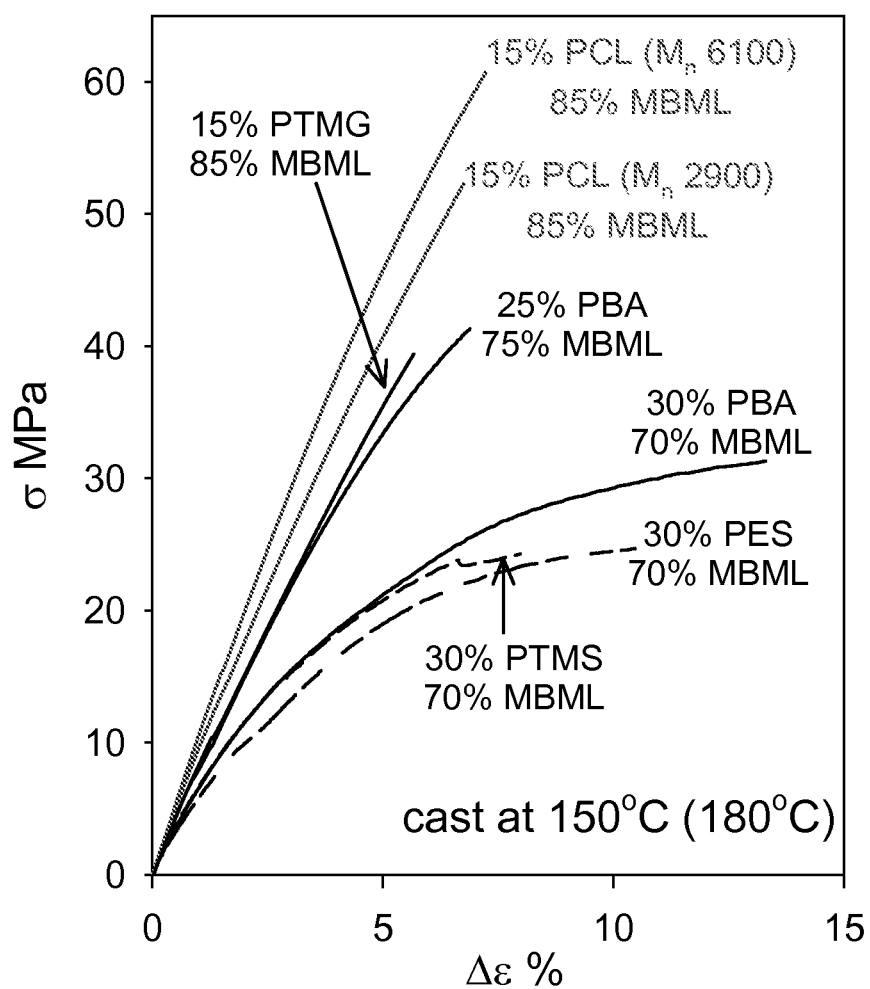
FIG. 7 shows a graph of tensile strength ($\sigma$ MPa) versus elongation-at-break ($\Delta\varepsilon$%) for compositions containing differing amounts of methylated ball milled lignin (MBML) with poly(butylene adipate) (referred to as "PBA"), poly(trimethylene succinate) (referred to as "PTMS"), poly(ethylene succinate) (referred to as "PES"), poly(trimethylene glutarate) (referred to as "PTMG") or poly($\varepsilon$-caprolactone) (referred to as "PCL") solution cast at 150° C. and then 180° C.

At first glance, methylated kraft lignins tend to form more ductile materials than MBML when both are blended with polyesters such as poly(butylene adipate) (PBA, $M_w$~12,000, Aldrich) at 25~30% incorporation levels. Yielding has not been observed during uniaxial extension of MBML-PBA blends when the content of MBML was reduced to 70% (FIG. 7). Other MBML-based materials containing poly(trimethylene succinate) (PTMS, $M_w$~9,500, Scientific Polymer Products, Inc., Ontario, N.Y.) or poly(ethylene succinate) (PES, $M_w$~10,000, Scientific Polymer Products, Inc., Ontario, N.Y.) are also weaker than expected: none of them possesses a tensile strength approaching 40 MPa (FIG. 7) except the ones containing 15% poly(trimethylene glutarate) (PTMG, $M_w$~4,000, Scientific Polymer Products, Ontario, N.Y.) and 25% PBA.

By contrast, multiphase blends of MBML and poly(ε-caprolactone) (PCL, Polymer Source, Inc, Dorval, QC, Canada) embody a substantial improvement in tensile properties that have been achieved with polymeric materials containing even more than 80% lignin. For example, blends containing 15% PCL can attain a tensile strength (σ) above 50 MPa with ~7% elongation at break (Δε) (FIG. 7), even though homogeneity of the materials was limited under the experimental conditions employed.

Methylated Ball-Milled Lignin (MBML) in Blends with Block Copolymers

Figure 8:
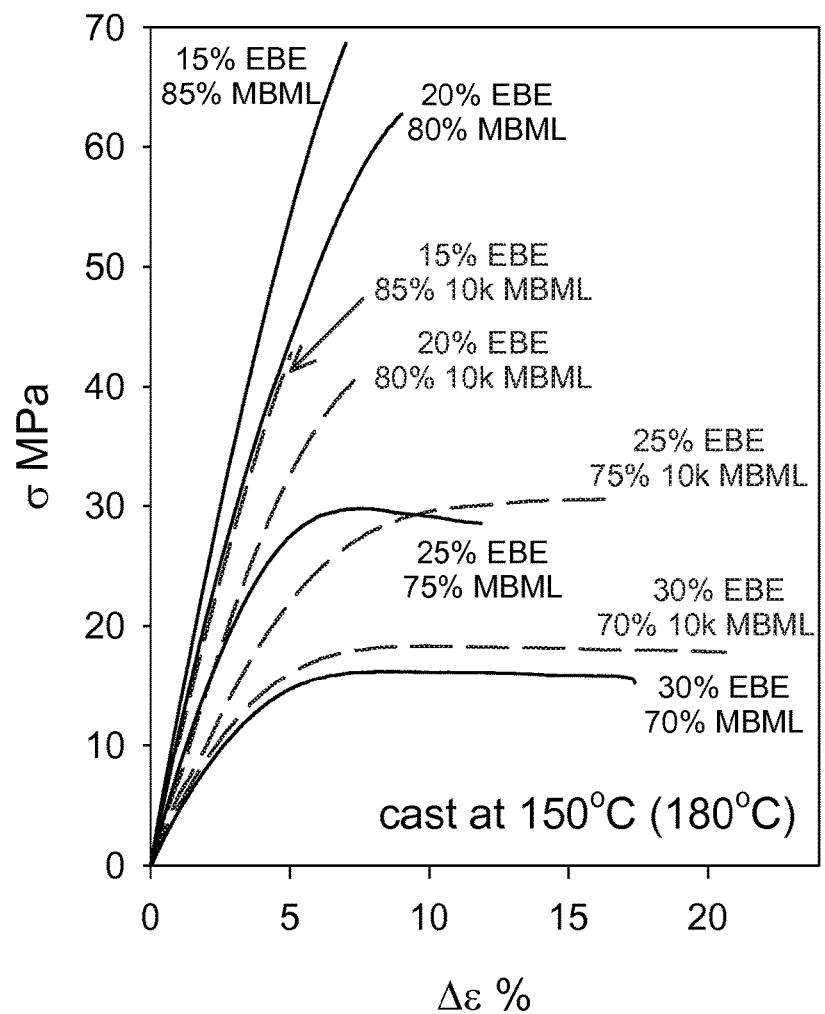
FIG. 8 shows a graph of tensile strength ($\sigma$ MPa) versus elongation-at-break ($\Delta\varepsilon$%) for compositions containing differing amounts of MBML or a high-molecular-weight MBML fraction (referred to as "10 k MBML") with poly(ethylene oxide-b-1,2-butadiene-b-ethylene oxide) (referred to as "EBE") solution cast at 150° C. and then 180° C.

With the incorporation of 15~20% poly(ethylene oxide-b-1,2-butadiene-b-ethylene oxide) (EBE, $M_n$ 4300-800-4300, Polymer Source, Inc, Dorval, QC, Canada), MBML-based polymer materials start to demonstrate their potential as excellent candidates for engineering plastics with tensile strengths well above 60 MPa (FIG. 8). On the other hand, their tensile properties are surprisingly sensitive to the EBE content when the latter is increased beyond 20%.

A methylated higher molecular-weight ball-milled lignin fraction (10 k MBML, ~67% of the total parent BML preparation) was progressively plasticized by EBE in the same manner as the parent MBML preparation. The lower molecular weight lignin components had been removed during exhaustive ultrafiltration in 0.1 M NaOH through a 10,000 nominal molecular weight cutoff membrane. Hereby, it was found that the plasticization-efficacies of 15~20% levels of EBE toward 10 k MBML are diminished substantially so that neither the tensile strength nor elongation at break is comparable to those of the corresponding parent MBML-based blends (FIG. 8). As the EBE content increases to 25~30%, the 10 k MBML-based blends become more ductile than the corresponding parent MBML ones, but no obvious improvement in their tensile strength can be observed. Those missing lower-molecular-weight lignin components may be responsible for the occurrence of chain rearrangements within the macromolecular complexes during solution casting, without which the mechanical properties of the materials tend to be compromised when the plasticizer content is low.

Figure 9:
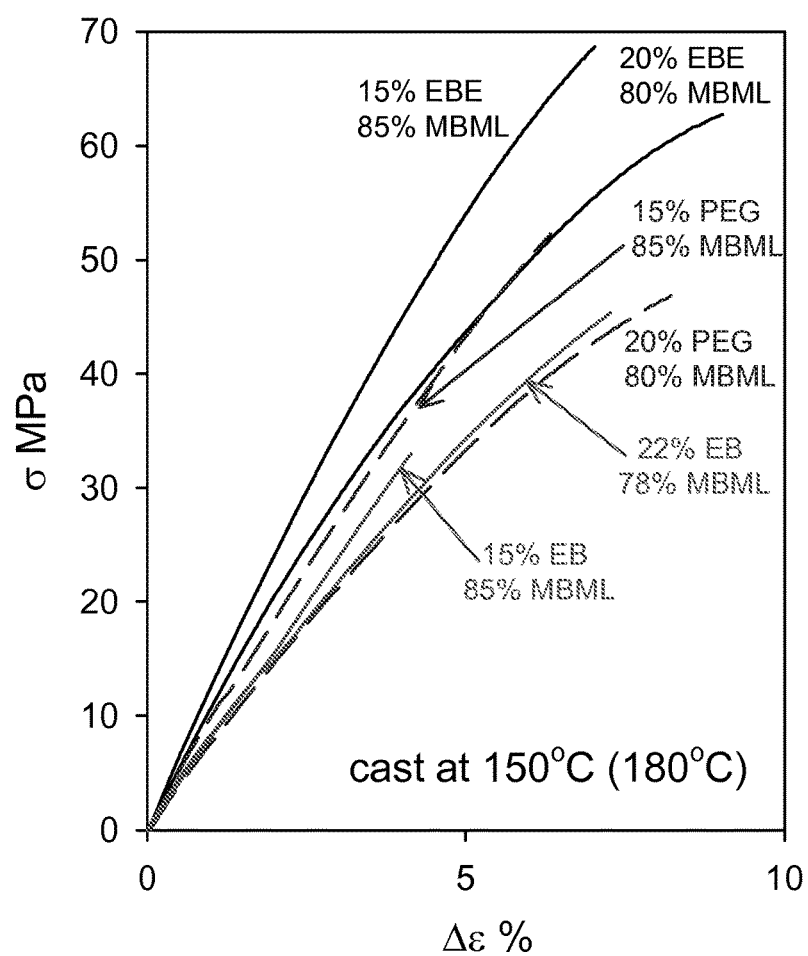
FIG. 9 shows a graph of tensile strength ($\sigma$ MPa) versus elongation-at-break ($\Delta\varepsilon$%) for compositions containing differing amounts of MBML with EBE, poly(ethylene oxide-b-1,2-butadiene) (referred to as "EB") or poly(ethylene glycol) (referred to as "PEG") solution cast at 150° C. and then 180° C.

The diblock co-polymer poly(ethylene oxide-b-1,2-butadiene) (EB, $M_n$ 4000-1800, Polymer Source, Inc, Dorval, QC, Canada) was blended with MBML in anticipation of the possibility that the longer polybutadiene chain would enhance the mechanical properties of the lignin-based materials. However, EB is not as miscible as EBE with MBML, and the corresponding MBML-based materials were more fragile (FIG. 9). In fact, polybutadiene alone was not miscible with MBML, and thus acted as a toughening component in the blends only when it is covalently bound to the miscible PEG fragments at both ends (FIG. 8).

MBML Alone and in Blends Containing Monomeric Plasticizers

Figure 10:
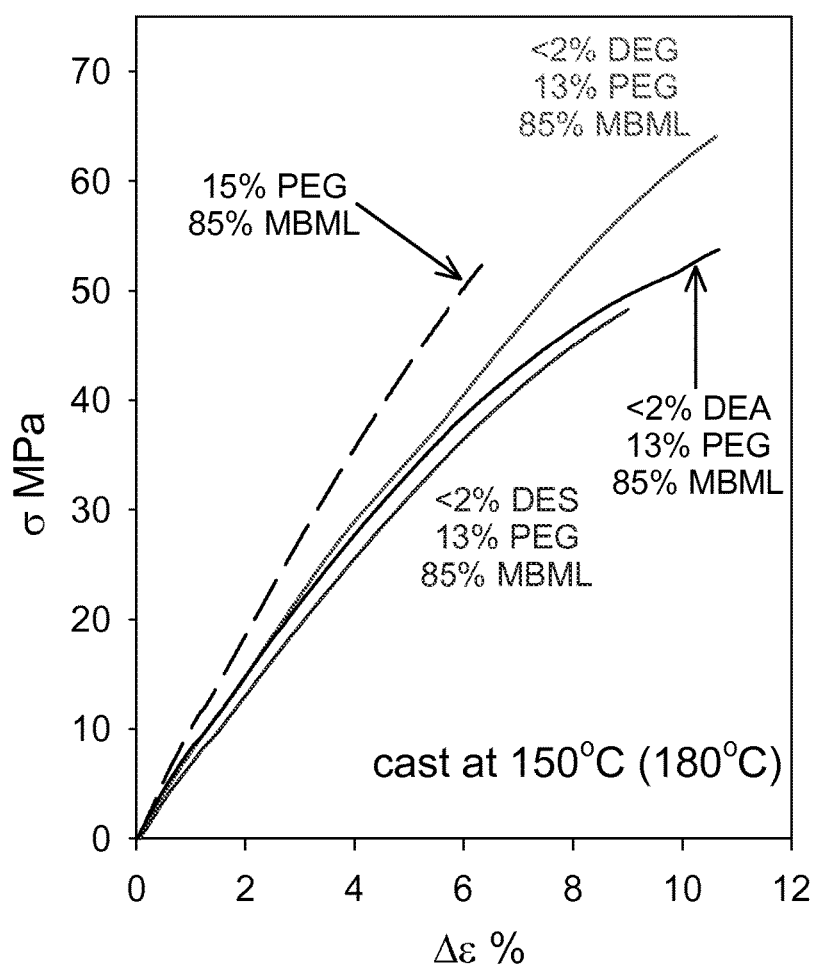
FIG. 10 shows a graph of tensile strength ($\sigma$ MPa) versus elongation-at-break ($\Delta\varepsilon$%) for compositions containing differing amounts of MBML and PEG with small quantities of diethyl glutarate (referred to as "DEG"), diethyl adipate (referred to as "DEA") or diethyl succinate (referred to as "DES") solution cast at 150° C. and then 180° C.

Tertiary MBML-based material blends containing 13% poly(ethylene glycol) (PEG, $M_n$=10,000, Aldrich) and 2% diesters were found to be more ductile than the corresponding binary blends with PEG when solution cast at 150° C. (FIG. 10). Among the three diesters employed in these tertiary blends, diethyl glutarate (DEG, Aldrich) was the most effective monomeric plasticizer in terms of enhancing the tensile strength of the binary-blend material (FIG. 10).

Figure 11:
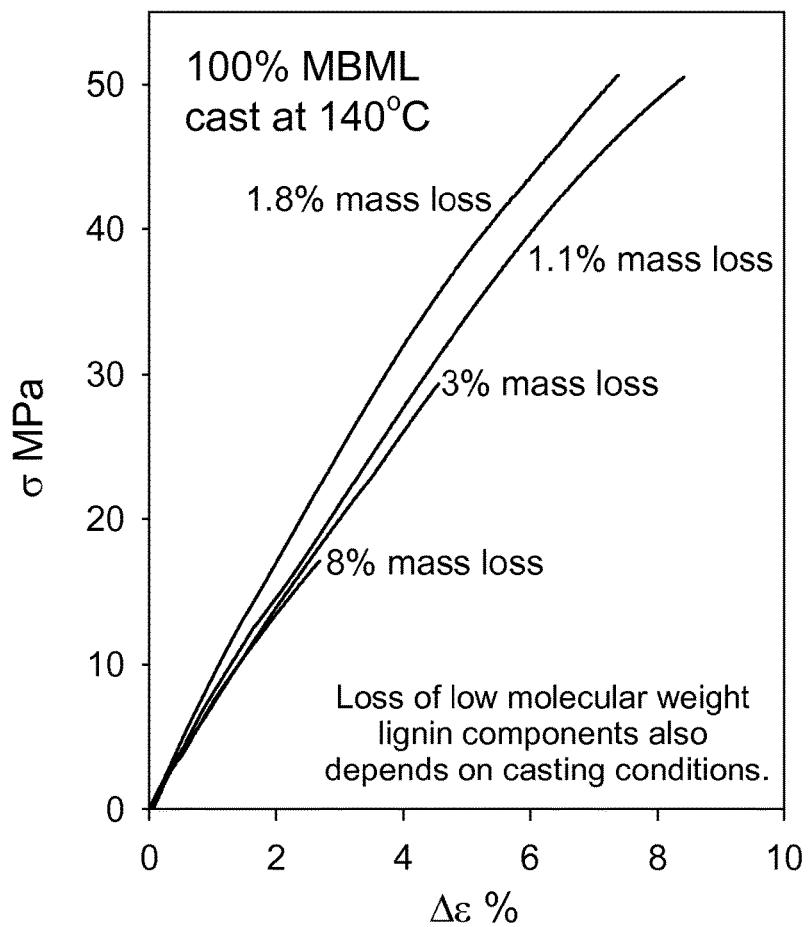
FIG. 11 shows a graph of tensile strength ($\sigma$ MPa) versus elongation-at-break ($\Delta\varepsilon$%) for compositions containing 100 wt % MBML solution cast for differing periods of time at 140° C.

When the casting temperature was lowered from 150 to 140° C., the polymeric materials composed of 100% MBML attained a tensile strength of ~50 MPa with ~8% elongation at break. Although the tensile properties of the materials were sensitive to the loss of volatile low molecular weight lignin components during the casting process (FIG. 11), this represents the first demonstration that polymeric materials made only of a simple lignin derivative can exhibit tensile properties comparable to those of common engineering plastics such as the examples listed in Table 1 below.

TABLE 1

Room-temperature tensile properties of selected engineering plastics

| Thermoplastic | Tensile strength MPa | Elongation at break % | Tensile modulus KPa |
|---|---|---|---|
| Styrene | 46 | 2.2 | 320 |
| Styrene-acrylonitrile (SAN) | 72 | 3 | 390 |
| Acrylonitrile-butadiene-styrene (ABS) | 48 | 8 | 210 |
| Flame-retardant ABS | 40 | 5.1 | 240 |
| Polypropylene (PP) | 32 | 15 | 130 |
| Polyethylene (PE) | 30 | 9 | 100 |

Alkylated kraft lignins can form miscible blends with aliphatic polyesters characterized by methylene/carboxylate group ratios ($CH_2$/COO) of 2.0~4.0; on the basis of the concavity of the $T_g$-composition curve, the interactions between the two blend components were found to be the most favorable when the $CH_2$/COO of the polyester lay between 2.5 and 3.0. The diesters selected here represent the repeating units of those polyesters with alkyl end groups that preclude hydrogen bond formation with lignin components. Most of the diesters evaporated significantly at elevated temperature during solution casting at 140° C. despite the fact that their boiling points are far above 200° C. The lignin losses indicated in FIGS. 12 and 13 were the mass losses from the control preparations composed of 100% MBML after casting under the same conditions as the binary blends containing the various diesters. The diester levels estimated in FIGS. 12 and 13 are the amounts after solution casting; 20~30% diethyl adipate (DEA, Aldrich), 30~45% diethyl glutarate (DEG) and 30% diethyl succinate (DES, Aldrich) were employed as initial diester contents in these blends (w/w).

Figure 12:
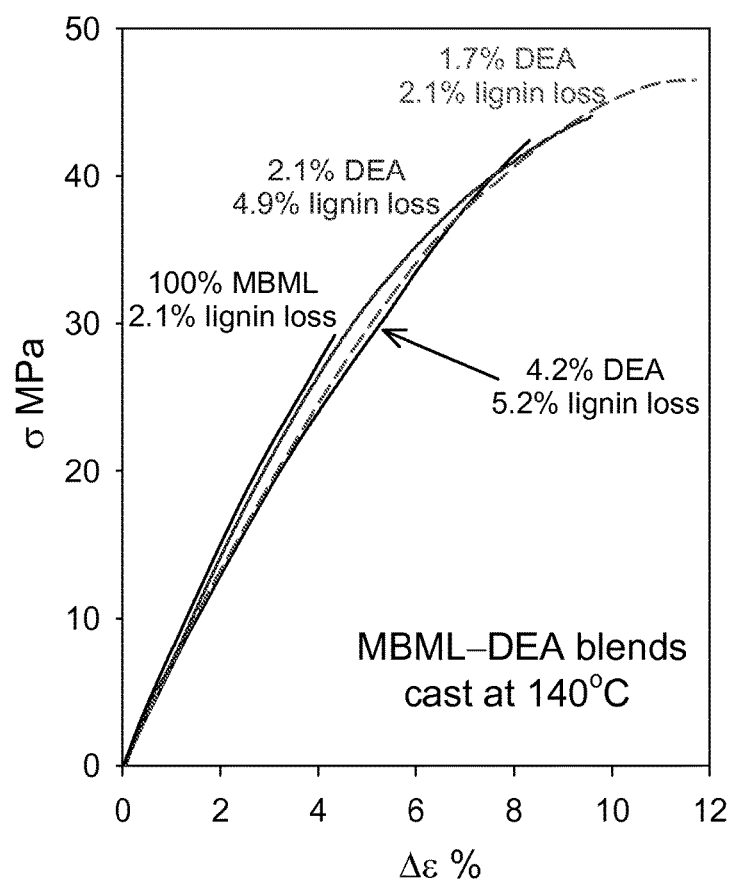
FIG. 12 shows a graph of tensile strength ($\sigma$ MPa) versus elongation-at-break ($\Delta\varepsilon$%) for compositions containing differing amounts of MBML and diethyl adipate (DEA) solution cast at 140° C.
Figure 13:
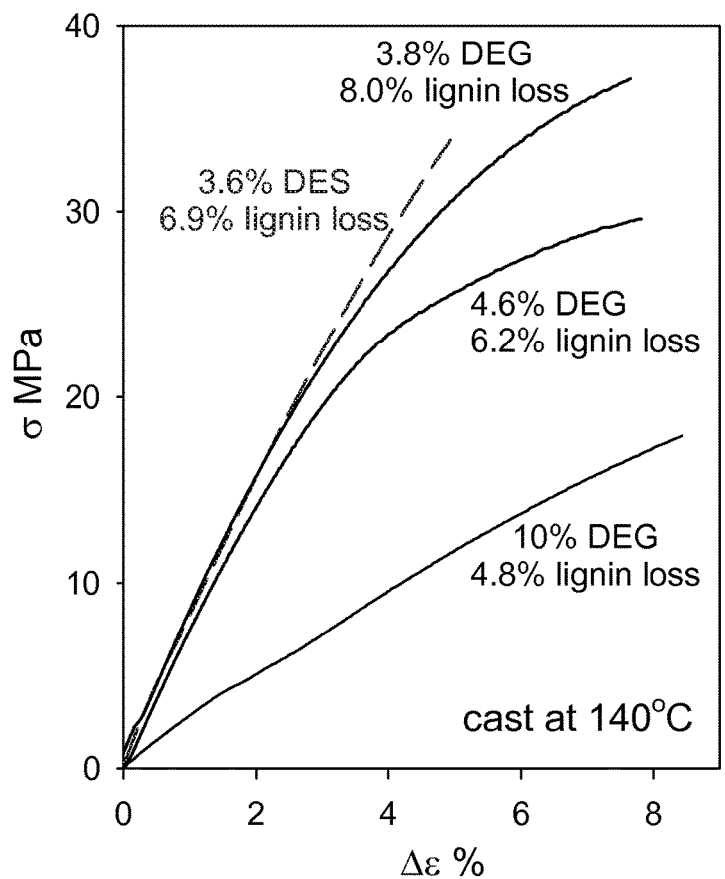
FIG. 13 shows a graph of tensile strength ($\sigma$ MPa) versus elongation-at-break ($\Delta\varepsilon$%) for compositions containing differing amounts of MBML, diethyl glutarate (DEG) and diethyl succinate (DES) solution cast at 140° C.

As shown in FIG. 12, the impact of the lost volatile low molecular weight lignin components can be compensated for by the monomeric plasticizer, DEA. For example, the ductility of 100% MBML with a 2.1% lignin loss during casting is improved 3-fold in the presence of 1.7% DEA, and its tensile strength is enhanced by 50% (FIG. 12). Although the contents of DEA remaining in the blends after casting were not determined directly, it is reasonable to suppose that its presence facilitates particular conformational changes in the constituent lignin components and thereby reduces the brittleness of these lignin-based materials (FIGS. 10 and 12). The intermolecular interactions between DEG and lignin components are so weak that the inherent cohesion of the material may be compromised by the presence of this diester, and as a result the strength of the material falls rapidly when more DEG molecules are retained in the blends cast at 140° C. (FIG. 13). The effect of DES does not appear to be any better than that of DEG (FIG. 13)

Figure 14:
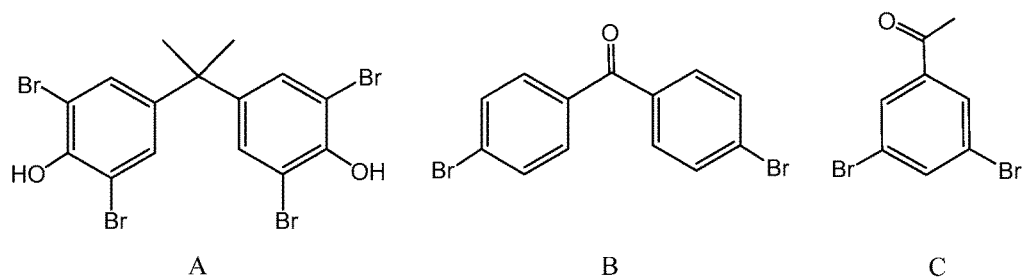
FIG. 14 shows the chemical structures of 3,3'5,5'-tetrabromobisphenol A (TBBP-A) (structure A), 4,4'-dibromobenzophenone (DBBP) (structure B) and 3'5'-dibromoacetophenone (DBAP) (structure C).

Binary blends of MBML and aromatic compounds with bulky electron withdrawing substituents (FIG. 14) have suggested new avenues for formulating lignin-based polymeric materials. The compound 3,3',5,5'-tetrabromobisphenol A (TBBP-A) is widely used as a reactive flame retardant in epoxy and polycarbonate resins and it also works as an additive flame retardant in acrylonitrile-butadiene-styrene (ABS), high impact polystyrene (HIPS) and phenolic resins. In the blends with MBML, TBBP-A (Aldrich) may act not only as a flame retardant, but also, more interestingly, as a plasticizer. When TBBP-A was cast alone in DMSO for 23 h, it decomposed to a dark brown globular material at 150° C. with significant mass loss, but it formed a light grey globular material at 140° C. as a result of less degradation.

Figure 15:
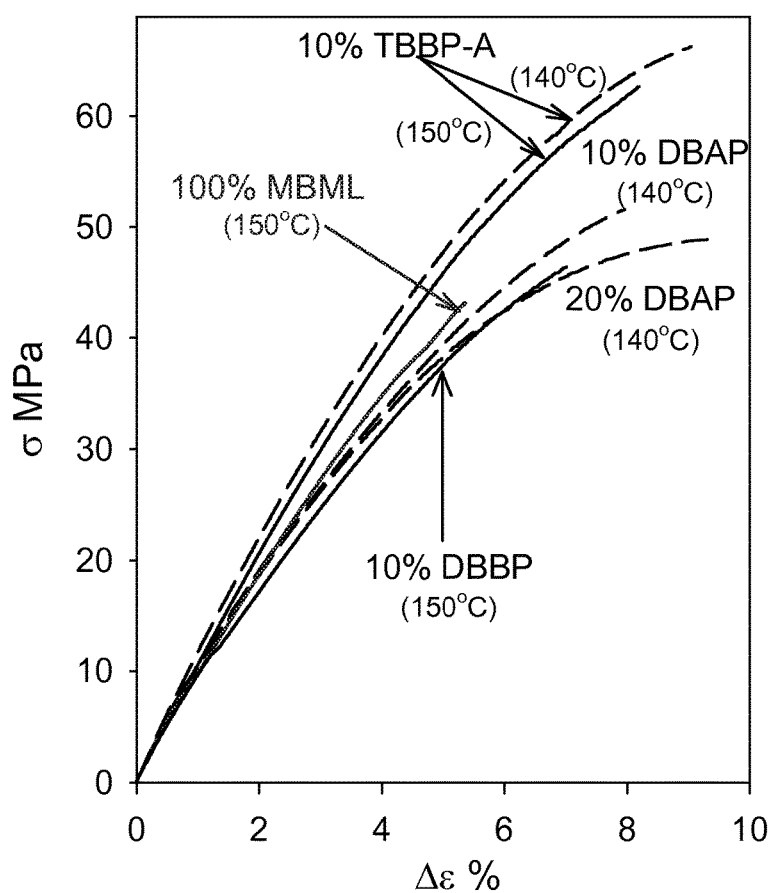
FIG. 15 shows a graph of tensile strength ($\sigma$ MPa) versus elongation-at-break ($\Delta\varepsilon$%) for compositions containing differing amounts of MBML and 3,3',5,5'-tetrabromobisphenol A (referred to as "TBBP-A"), 3',5'-dibromoacetophenone (referred to as "DBAP") and 4,4'-dibromobenzophenone (referred to as "DBBP") solution cast at 140 or 150° C.

However, its decomposition at elevated temperatures seems to be inhibited by the presence of MBML. The MBML-based materials containing 10% TBBP-A, whether solution cast at 140 or 150° C., did not differ significantly from one another in terms of their tensile behavior, they were capable of attaining tensile strengths above 60 MPa with elongations at break of 8~9% regardless of the difference in casting temperatures (FIG. 15). By comparison, 10% 4,4'-dibromobenzophenone (DBBP) (which itself possesses a lower frequency of electron-withdrawing groups on the aromatic rings) plasticized MBML-based materials less effectively; this was revealed by the fact that the material containing only MBML exhibited a tensile strength of ~40 MPa which is very similar to the value for the 10% DBBP blend.

The plasticizer contents indicated in FIG. 15 represent the blend compositions for each test piece prior to casting. The contents of 3',5'-dibromoacetophenone (DBAP, American Custom Chemicals Corporation, San Diego, Calif.) in the cast material are lower than the initial values for the same reason as encountered with the diesters. The remaining levels of the initial 10% and 20% contents of DBAP in the blends are ~1.5% and 11% respectively, and yet the poor efficiency of plasticization by DBAP evident in FIG. 15 implies that the intermolecular interactions between DBAP and the lignin components do not enhance blend-material deformability.

Methylated Ball-Milled Lignin in Blends with Poly(Ethylene Glycol) (PEG)

Figure 16:
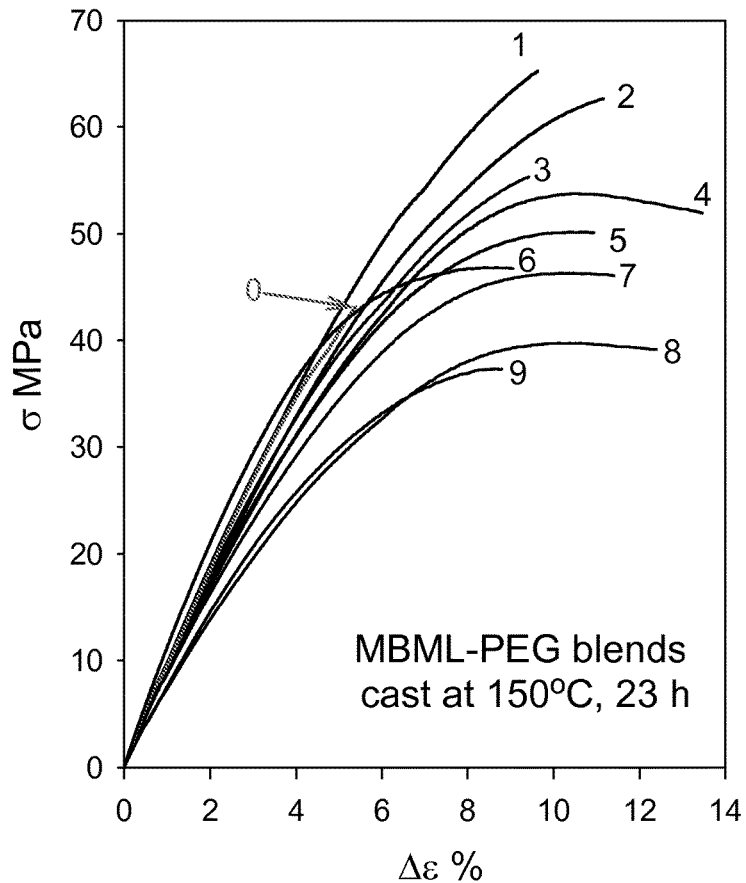
FIG. 16 shows a graph of tensile strength ($\sigma$ MPa) versus elongation-at-break ($\Delta\varepsilon$%) for compositions containing differing amounts of MBML with PEG fractions possessing different molecular weights, or with poly(ethylene glycol) methyl ether (referred to as "PEGM") solution cast at 150° C.

In the case of methylated milled wood lignin (FIG. 16), PEGs act as efficient plasticizers: in general, they are able to improve the ductility of the MBML polymeric material 2~3 fold with increasing PEG levels up to 15%; concomitantly, the tensile strength of the material decreases significantly from 65 to 40 MPa as more PEG is added to the blend. It is remarkable that the MBML-based blend containing 15% poly(ethylene glycol) methyl ether (PEGM, $M_n$ 5000) is more brittle than the corresponding blend with PEG ($M_n$ 4600) (FIG. 16). This suggests that PEG molecules interact with lignin components partially through hydrogen bonding between the hydroxyl end groups of PEG chains.

The PEGs selected herein possess number-average molecular weights ($M_n$) ranging from 400 to 10,000, and their physical states vary from liquid to waxy solid materials depending on the molecular weight. Interestingly, the mechanical properties of the MBML-PEG blends seem to be sensitive to the molecular weight distribution of plasticizer: MBML-based blends plasticized by low molecular weight PEG tend to attain better tensile strengths. It is very likely that the incorporation of shorter-chain PEGs into regions between the lignin components are more favored due to the higher concentration of hydroxyl end groups per unit volume of lower-molecular-weight PEG, which contribute to increasing stabilization energies for the blends.

Ligninsulfonate (Also Called Lignosulfonate)

Softwood ligninsulfonate ($\overline{M}_w$ and $\overline{M}_n$ estimated to be 23,400 and 12,900, respectively) was produced from forest residues primarily (~90%) composed of Douglas fir wood (J. Y. Zhu, M. S. Chandra, F. Gu, R. Gleisner, R. Reiner, J. Sessions, G. Marrs, J. Gao, D. Anderson, *Bioresource Technology*, 2015, 179, 390-397). The lignocellulosic material was treated at 145° C. for 4 h with aqueous bisulfite solution (3.55 L/kg liquor-to-wood ratio containing 2.5 wt % sulfur dioxide and 6.5 wt % calcium bisulfite relative to the wood). After consecutive ultrafiltration through 200 kDa and 4 kDa nominal-molecular-weight-cutoff membranes, the calcium ligninsulfonate (87% purity) retained by the less permeable membrane embodied a 6.9% sulfur content.

After ultrafiltration in water through a 1 kDa nominal-molecular-weight-cutoff membrane, the ligninsulfonate retained was methylated with dimethyl sulfate in aqueous 50% dioxane at pH ~12. After acidification to pH 9, the dioxane was removed under reduced pressure, and the remaining aqueous solution was ultrafiltered with water, again through a 1 kDa membrane. After centrifugation to remove traces of insoluble material, the retentate was freeze-dried. The partially methylated ligninsulfonate was protonated using Amberlite IR120 in methanol, whereupon it was further methylated with diazomethane in chloroform. After thorough washing with water, the methylated ligninsulfonate solution in chloroform was dried and the solvent was removed under reduced pressure.

Solution-casting of the methylated ligninsulfonate in DMSO with 10% levels of miscible blend components such as poly(trimethylene glutarate) produced polymeric materials that were comparable in strength to those formed from methylated ball-milled lignin above.

One skilled in the art will appreciate that the articles, devices and methods described herein can be practiced with embodiments other than those disclosed. The disclosed embodiments are presented for purposes of illustration and not limitation. One will also understand that components of the articles, devices and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of compositions including lignin are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. An article formed from a composition comprising:
at least about 75 weight percent (wt %) alkylated native lignin, unalkylated native lignin, or combinations thereof based on the total weight of the composition without any solvent(s), wherein the article has an elongation-at-break of at least about 1.5%, a tensile strength of at least about 35 MPa, or both.

2. The article according to claim 1, wherein the alkylated native lignin, unalkylated native lignin, or combinations thereof comprises ball milled lignin.

3. The article according to claim 1, wherein the alkylated native lignin comprises methylated ball milled lignin.

4. The article according to claim 1, wherein the composition further comprises lignosulfonate.

5. The article according to claim 1, wherein the composition further comprises methylated lignosulfonate.

6. The article according to claim 1, wherein the alkylated native lignin is methylated with dimethyl sulfate.

7. The article according to claim 6, wherein the alkylated native lignin is further methylated with diazomethane.

8. The article according to claim 1, wherein the composition further comprises a plasticizer.

9. The article according to claim 1, wherein the composition consists essentially of alkylated native lignin or native lignin.

10. The article according to claim 1, wherein the article is formed using solvent casting.

11. The article according to claim 1, wherein the article is formed using melt blending, extrusion, or any combination thereof.

12. The article according to claim 1, wherein the article has a tensile strength of at least about 35 MPa.

13. The article according to claim 1, wherein the article has an elongation-at-break of at least about 1.5%.

14. A material formed from a composition, the composition comprising:
at least about 75 weight percent (wt %) alkylated native lignin, unalkylated native lignin, or combinations thereof based on the total weight of the composition without any solvent(s), the material having a tensile strength of at least about 35 MPa and an elongation-to-break of at least about 1.5%.

15. The material according to claim 14, wherein the material comprises alkylated native ball milled lignin, unalkylated native ball milled lignin, or combinations thereof.

16. The material according to claim 14, wherein the composition further comprises alkylated lignosulfonate or unalkylated lignosulfonate.

17. The material according to claim 14, wherein the material further comprises a plasticizer.

18. The material according to claim 14, wherein the material comprises about 85 wt % alkylated native lignin, unalkylated native lignin, or combinations thereof based on the total weight of the composition without any solvent(s).

19. The material according to claim 14, wherein the material consists essentially of alkylated native lignin.

* * * * *